US010161309B2

(12) United States Patent
Reuben et al.

(10) Patent No.: US 10,161,309 B2
(45) Date of Patent: Dec. 25, 2018

(54) THERMALLY COMPLIANT FITTING FOR HIGH TEMPERATURE TUBE APPLICATIONS

(71) Applicant: United Technologies Corporation, Hartford, CT (US)

(72) Inventors: Jonathan C. Reuben, West Hartford, CT (US); Pawel Socha, Manchester, CT (US); Richard J. Bulkovitch, Amston, CT (US)

(73) Assignee: United Technologies Corporation, Farmington, CT (US)

( * ) Notice: Subject to any disclaimer, the term of this patent is extended or adjusted under 35 U.S.C. 154(b) by 730 days.

(21) Appl. No.: 14/618,639

(22) Filed: Feb. 10, 2015

(65) Prior Publication Data

US 2016/0230910 A1   Aug. 11, 2016

(51) Int. Cl.
*F16L 17/00* (2006.01)
*F02C 7/06* (2006.01)
*F01D 9/06* (2006.01)
*F01D 25/16* (2006.01)

(52) U.S. Cl.
CPC .............. *F02C 7/06* (2013.01); *F01D 9/065* (2013.01); *F01D 25/16* (2013.01); *F05D 2260/98* (2013.01)

(58) Field of Classification Search
CPC . F02C 7/06; F01D 25/16; F01D 9/065; F05D 2260/98
USPC ...... 285/123.3, 123.12, 123.13, 123.14, 368, 285/412; 60/796; 384/316
See application file for complete search history.

(56) References Cited

U.S. PATENT DOCUMENTS

| | | | |
|---|---|---|---|
| 2,804,280 A | 8/1957 | Wheatley | |
| 3,012,252 A * | 12/1961 | Gaddy | E03D 11/16 285/123.14 X |
| 4,626,001 A | 12/1986 | Lee | |
| 5,108,045 A | 4/1992 | Law | |
| 5,230,540 A * | 7/1993 | Lewis | F02K 1/80 285/368 X |
| 5,272,869 A | 12/1993 | Dawson et al. | |
| 5,593,279 A | 1/1997 | Hayashi | |
| 5,799,629 A | 9/1998 | Lowi | |
| 6,070,910 A * | 6/2000 | Hodges | E03D 11/16 |
| 6,446,592 B1 | 9/2002 | Wilksch | |
| 6,467,820 B1 * | 10/2002 | Albrecht | F16L 23/02 285/368 X |
| 8,628,122 B2 * | 1/2014 | Kozal | F16L 19/028 285/412 |

(Continued)

OTHER PUBLICATIONS

Extended EP Search Report dated Jul. 7, 2016.

(Continued)

*Primary Examiner* — Greg Binda
(74) *Attorney, Agent, or Firm* — O'Shea Getz P.C.

(57) ABSTRACT

A fitting is configured to couple a portion of a frame of a turbine and a bearing housing on an aircraft engine. The fitting includes a first receptacle configured to seat a tube that is configured to convey oil or air, and at least a second receptacle configured to seat a corresponding at least two bolts associated with the bearing housing, wherein the fitting comprises sections between the first receptacle and the at least a second receptacle that have a material thickness in a range of 3.175 millimeters and 6.35 millimeters.

7 Claims, 11 Drawing Sheets

(56) References Cited

U.S. PATENT DOCUMENTS

2004/0026922 A1    2/2004   Carns et al.
2014/0030088 A1    1/2014   Coffin et al.
2015/0219015 A1    8/2015   Szymanski

OTHER PUBLICATIONS

John Brandon, "Properties of Metals", Fly Safe! Builders Guide to Safe Aircraft Materials, Recreationalflying.com, Rev. 16, Oct. 4, 2010.

Ben Syson, "Bolted Aluminum Tube Construction for Minimum Aeroplanes", Royal Aeronautical Society Light Aircraft Design Conference, 2011.

Joe Corcoran, "Advances in Gas Turbine Couplings", Proceedings of the Thirty-Sixth Turbomachinery Symposium, pp. 157-172, 2007.

Bernard L. Koff, "Gas Turbine Technology Evolution—A Designer's Perspective", AIAA 2003-2722, American Institute of Aeronautics and Astronautics, Inc., AIAA/ICAS International Air and Space Symposium and Exposition: The Next 100 Y, Dayton, Ohio, Jul. 14-17, 2003.

FAA.gov, "Chapter 5 Aircraft Materials, Processes, & Hardware", pp. 1-84, downloaded from <http://www.faa.gov/regulations_policies/handbooks_manuals/aircraft/amt_handbook/media/faa-8083-30_ch05.pdf> on Dec. 17, 2014.

\* cited by examiner

THERMALLY COMPLIANT FITTING FOR HIGH TEMPERATURE TUBE APPLICATIONS

BACKGROUND

On some aircraft engines, a tubing may couple a frame, such as a mid-turbine frame, to a housing, such as a bearing housing, for purposes of conveying fluids (e.g., lubricants, such as oil). The tubing may be exposed to relatively elevated temperatures (e.g., on the order of 1800 degrees Fahrenheit), due to being placed in a gas path. A fitting coupling the tubing to the bearing housing may subjected to a temperature of approximately 500 degrees Fahrenheit. The bearing housing may operate at a temperature of approximately 350 degrees Fahrenheit.

One or more seals are used in connection with the engines in an effort to ensure that the fluids do not leak. However, due to the large temperature gradients/differences between the various components (e.g., the tubing, the fitting, the bearing housing) during operation, gaps between the mating parts that axial seals connect may develop. If a gap exceeds a threshold, the potential exists for a leak to develop.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a fitting configured to couple a portion of a frame of a turbine and a bearing housing on an aircraft engine, comprising: a first receptacle configured to seat a tube that is configured to convey oil or air, and at least a second receptacle configured to seat a corresponding at least two bolts associated with the bearing housing, wherein the fitting comprises sections between the first receptacle and the at least a second receptacle that have a material thickness in a range of 3.175 millimeters and 6.35 millimeters. In some embodiments, the sections are approximately 5.1 millimeters thick thick. In some embodiments, the at least a second receptacle comprises three receptacles configured to seat three corresponding bolts. In some embodiments, the fitting further comprises a seal groove that is substantially located around the perimeter of the fitting.

Aspects of the disclosure are directed to a system comprising: at least one tube, a bearing housing, and a fitting that includes: a first receptacle configured to seat the at least one tube, and at least a second receptacle configured to seat a corresponding at least one bolt associated with the bearing housing, wherein the fitting comprises sections between the first receptacle and the at least a second receptacle that have a material thickness in a range of 3.175 millimeters and 6.35 millimeters. In some embodiments, the sections are approximately 5.1 millimeters thick. In some embodiments, the at least a second receptacle comprises three receptacles configured to seat three corresponding bolts. In some embodiments, the system further comprises a seal groove that is substantially located around the perimeter of the fitting. In some embodiments, the at least one tube comprises at least two tubes. In some embodiments, a first of the at least two tubes is nested within a second of the at least two tubes. In some embodiments, the at least one tube is configured to convey oil or air.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
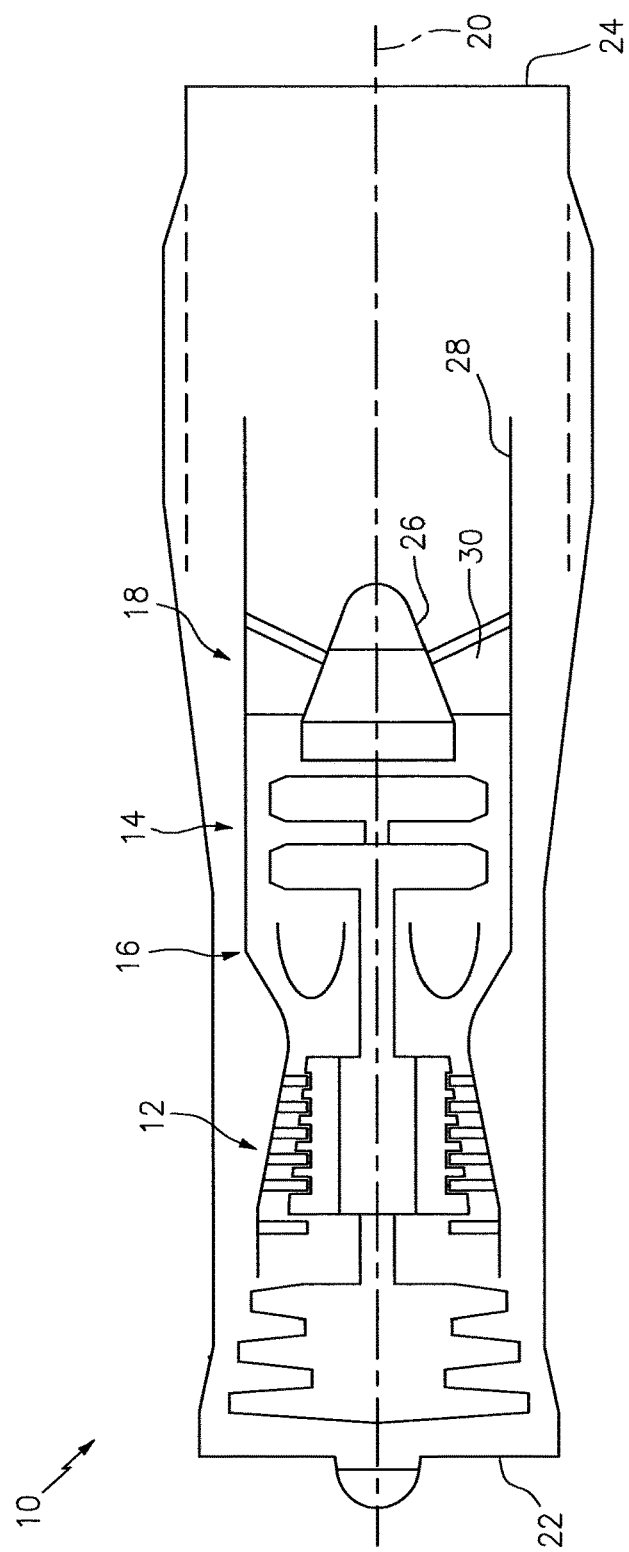
FIG. 1 illustrates an exemplary gas turbine engine in accordance with aspects of this disclosure.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a tube for a lubrication or air system. The system may be used on an aircraft and may be incorporated in connection with one or more engines of the aircraft. Aspects of the disclosure are associated with a fitting of the tube. For example, aspects of the disclosure are associated with a profile of the fitting.

Aspects of the disclosure may be applied in connection with an aircraft, or portion thereof. For example, aspects of the disclosure may be applied in connection with a gas turbine engine. FIG. 1 is a side-sectional illustration of an exemplary gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmentor section. The compressor section 12, the first engine hot section 16, the turbine section 14 and the second engine hot section 18 may be sequentially aligned along an axial centerline 20 between a forward engine airflow inlet 22 and an aft engine airflow exhaust 24. The second engine hot section 18 may include a first (e.g., annular, radial inner) duct case 26, a second (e.g., annular, radial outer) duct case 28, and one or more hot section vanes 30.

The engine 10 is illustrative. Aspects of the disclosure may be applied in connection with other engine types or configurations.

Figure 2:
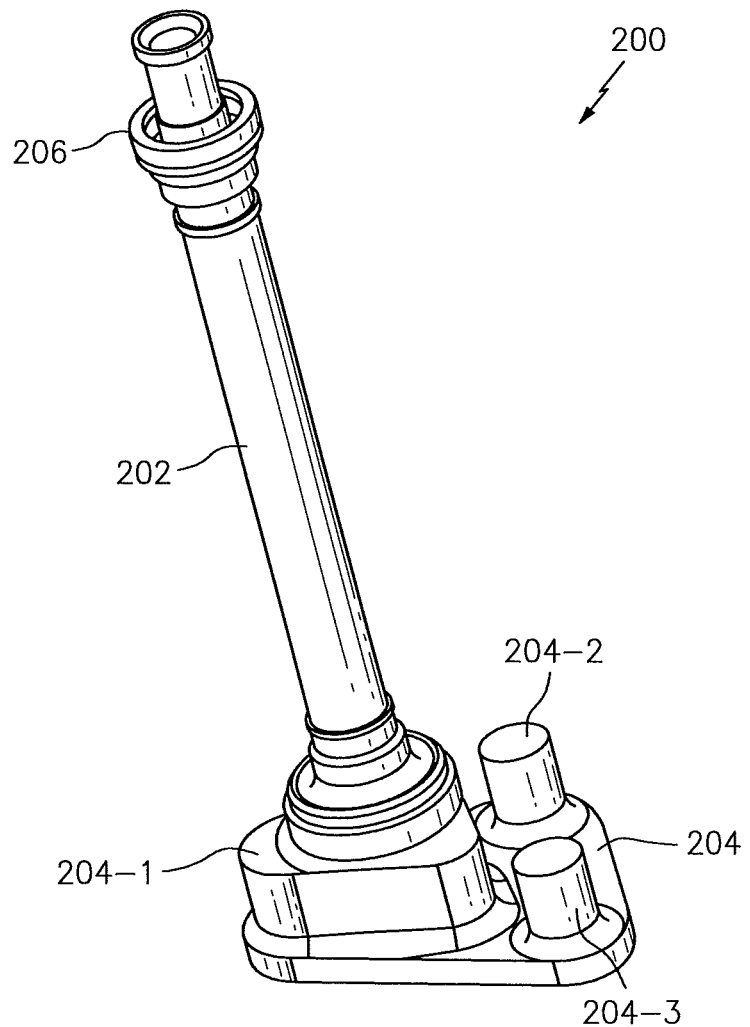
FIG. 2 illustrates an assembly for fluidly coupling a portion of a turbine frame to a bearing housing.

Referring to FIG. 2, a system assembly 200 in accordance with aspects of the disclosure is shown. The system 200 includes a tube 202 that may be used to convey fluids (e.g., oil). In some embodiments, the tube 202 may include multiple tubes; for example, the tube 202 may include a first, interior tube nested within a second, exterior tube.

The tube 202 may couple to a first fitting 204. The fitting 204 may include one or more receptacles. A first receptacle 204-1 may be configured to couple to/seat the tube 202. A second receptacle 204-2 may be configured to couple to/seat a first bolt associated with a bearing housing (not shown in FIG. 2, but shown and described below in connection with FIGS. 7-8). A third receptacle 204-3 may be configured to couple to/seat a second bolt associated with the bearing housing. Any number of bolts or receptacles may be used in some embodiments.

The tube 202 may couple to a (portion of a) frame or support structure associated with a turbine (e.g., turbine section 14 of FIG. 1) towards an end 206 of the tube 202.

Figure 3A:
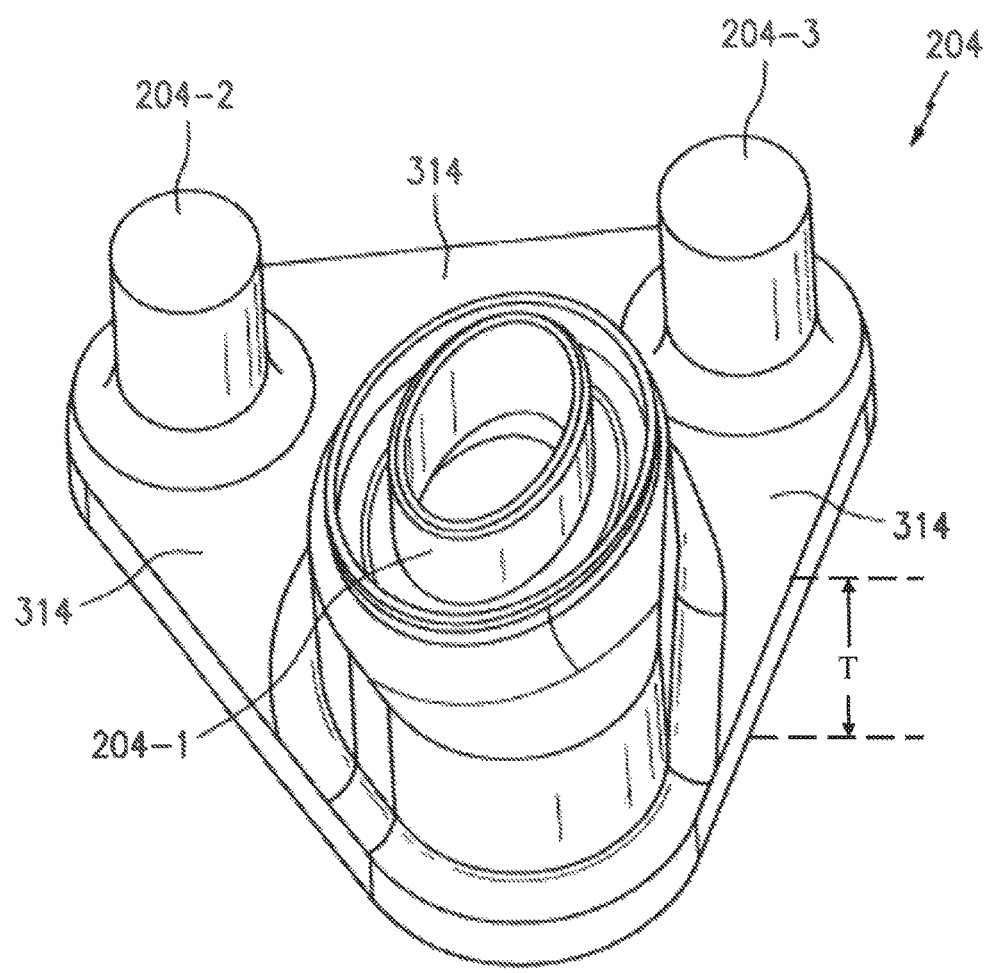
FIG. 3A illustrates a first perspective view of a fitting of FIG. 2.
Figure 3B:
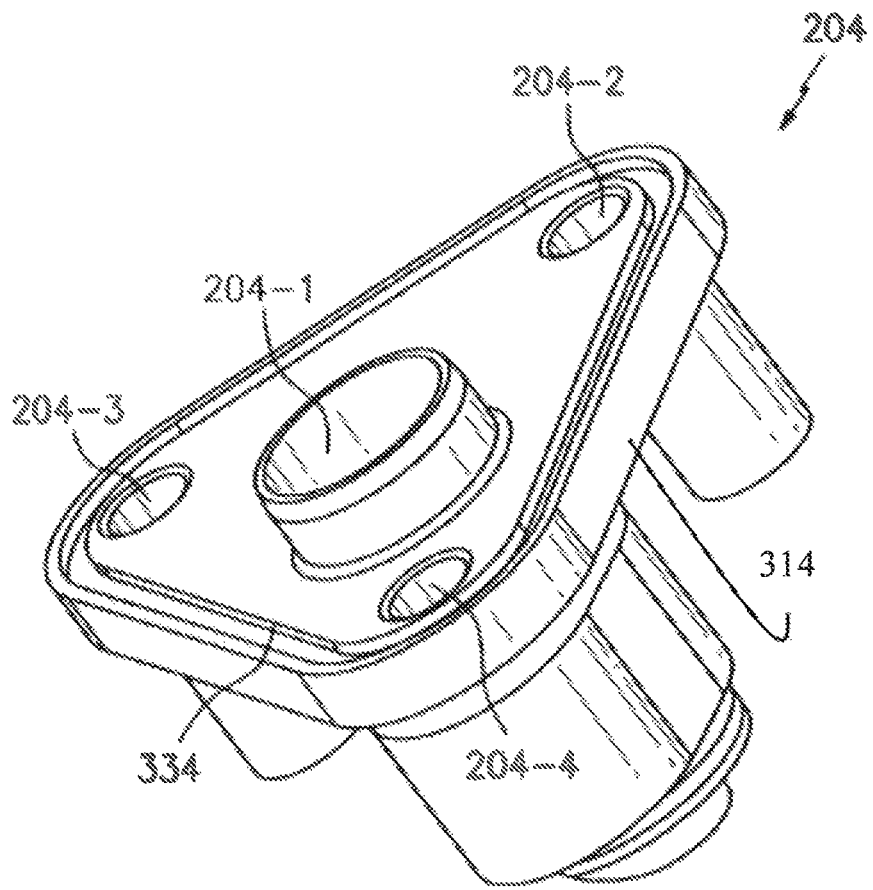
FIG. 3B illustrates a second perspective view of the fitting of FIG. 2.

Referring to FIGS. 3A-3B (collectively referred to as FIG. 3), a closer view of the fitting 204 is shown. As shown in FIG. 3, the fitting may include relatively thin sections of material 314 between receptacles 204-1 through 204-4 (where receptacle 204-4 may be configured to couple to/seat a third bolt associated with the bearing housing). In some embodiments, the sections 314 may be approximately two-tenths of an inch (0.2") (or approximately 5.1 millimeters) thick 'T'. In some embodiments, the thickness 'T' may be between approximately one-eighth of an inch (0.125") (or approximately 3.175 millimeters) and one-quarter of an inch (0.25") (or approximately 6.35 millimeters).

As shown in FIG. 3, the fitting 204 may include a seal groove 334. The seal groove 334 may be substantially located around the perimeter of the fitting 204. The seal groove 334 may be used for coupling/seating the fitting 204 with respect to a surface of the bearing housing. The seal groove 334 may help to ensure that the fitting 204 maintains contact with bearing housing within a threshold amount and potential leakage past the bolts is contained by the seal.

Figure 4A:
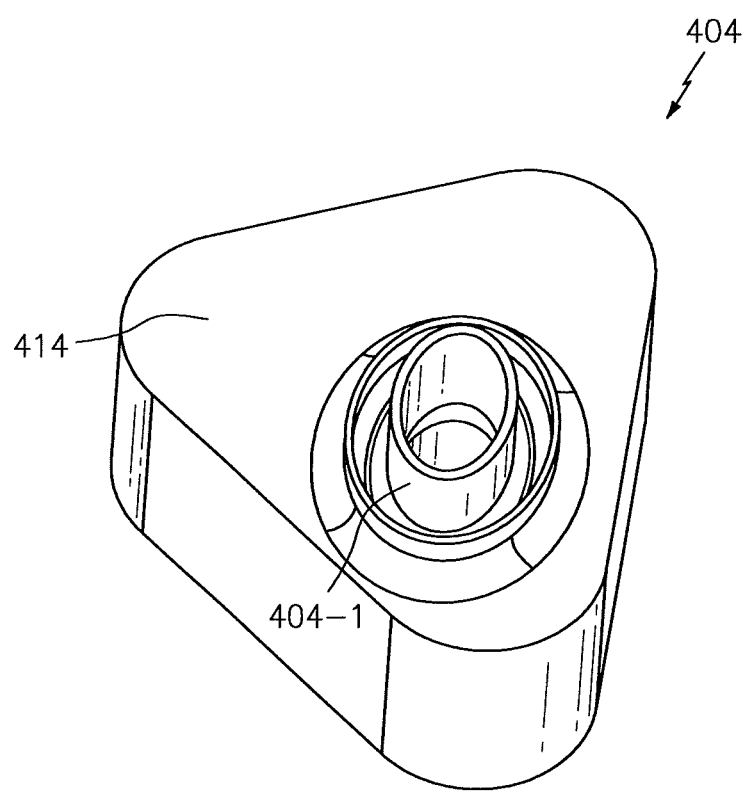
FIG. 4A illustrates a first perspective view of a fitting in accordance with the prior art.
Figure 4B:
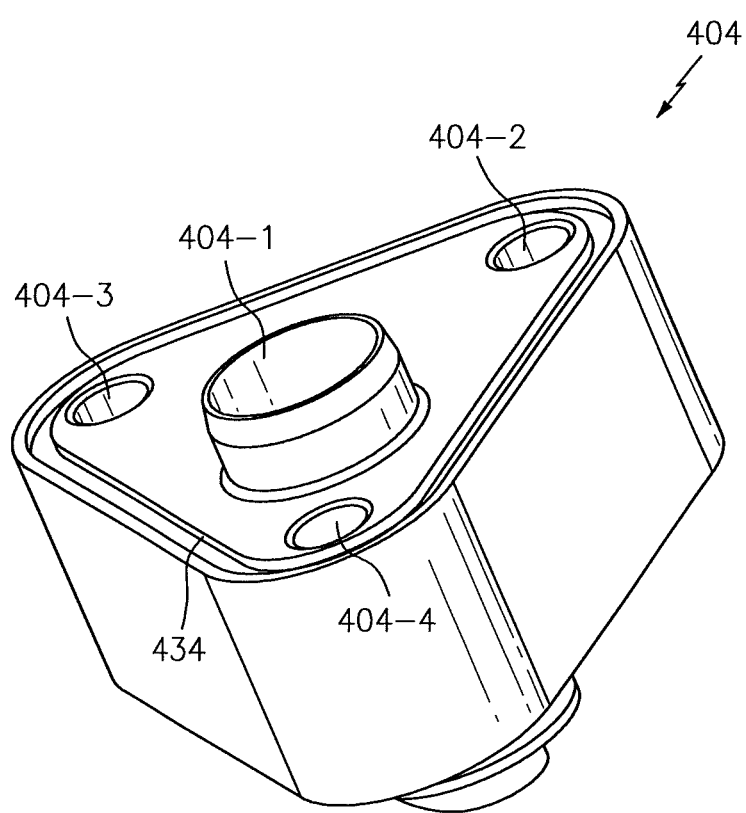
FIG. 4B illustrates a second perspective view of the fitting of FIG. 4A in accordance with the prior art.

In contrast to FIG. 3, FIGS. 4A-4B (collectively referred to as FIG. 4) illustrate a fitting 404 in accordance with the prior art. The fitting 404 includes a receptacle 404-1 for accommodating a tube (e.g., the tube 202 of FIG. 2) and a seal groove 434 for coupling/seating the fitting 404 with respect to a bearing housing. Receptacles 404-2, 404-3, and 404-4 may be used to couple to/seat bolts associated with the bearing housing.

Unlike the fitting 204 of FIGS. 2-3, the fitting 404 does not include thin sections of material 314 between receptacles 404-1 through 404-4. Instead, the fitting 404 is manufactured generally in the form of a solid, uniform block with material section 414 thickness of approximately eight-tenths of an inch (0.8") (or approximately 20.3 millimeters).

Figure 5:
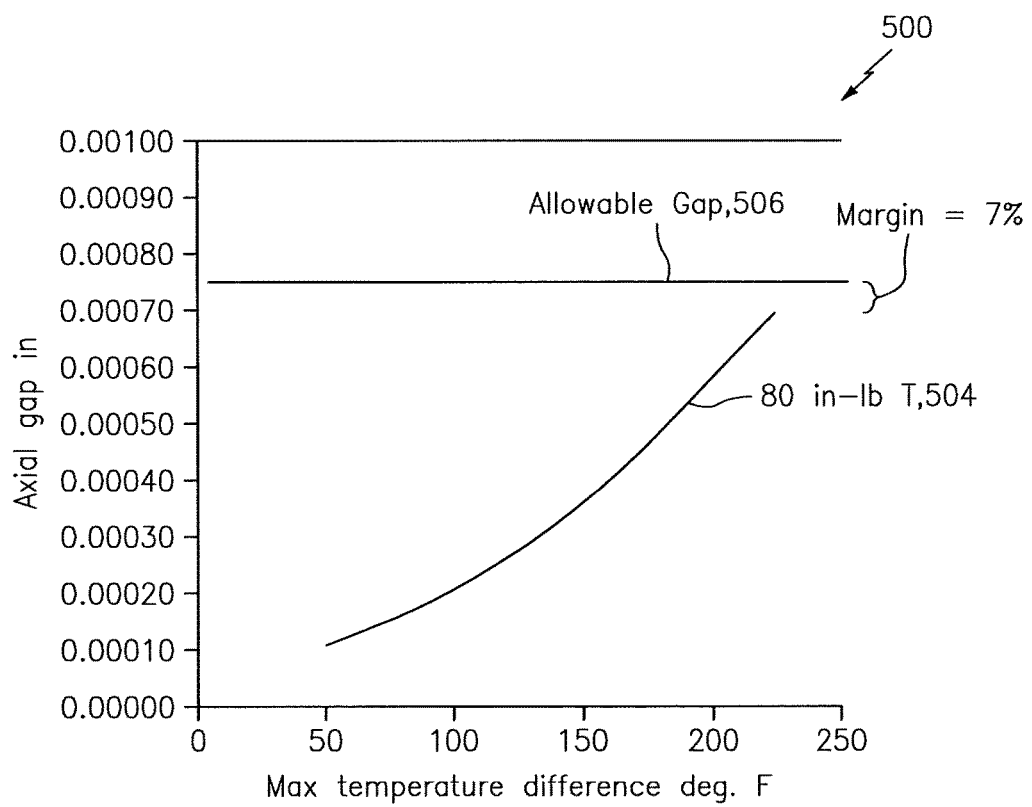
FIG. 5 illustrates a graph depicting a gap between the fitting of FIGS. 4A-4B over a range of temperature gradients/differences in accordance with the prior art.
Figure 6:
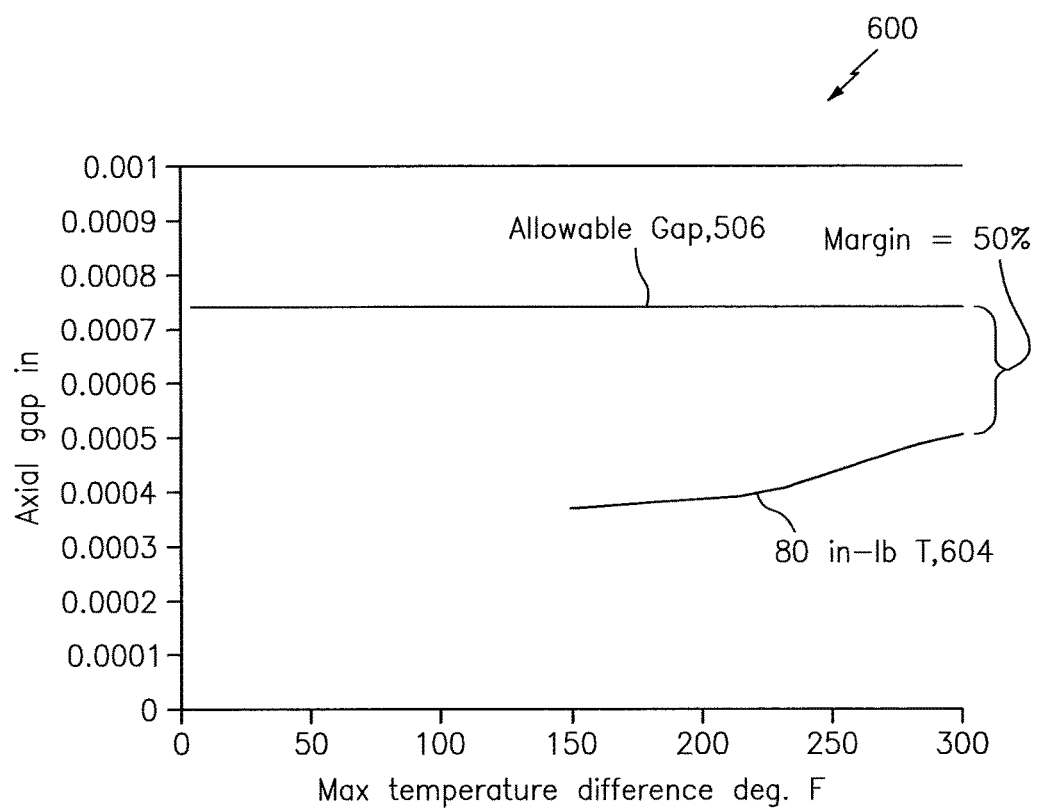
FIG. 6 illustrates a graph depicting a gap between the fitting of FIGS. 3A-3B over a range of temperature gradients/differences in accordance with aspects of this disclosure.

The use of the thin material section 314 may enable the fitting 204 to maintain a more consistent sealing interface relative to the fitting 404 over temperature. This is reflected in the graphs 500 and 600 depicted in FIGS. 5-6. In FIG. 5, which is indicative of the use of the fitting 404, a gap 504 (the value of which is reflected on the vertical or y-axis (in inches)) between the fitting 404 and the bearing housing approaches an "allowable gap" threshold 506 (within a margin of 7%) as a temperature gradient/difference (as reflected on the horizontal or x-axis) approaches, or slightly exceeds, 200 degrees Fahrenheit (or approximately 93 degrees Celsius). In FIG. 6, which is indicative of the use of the fitting 204, a gap 604 between the fitting 204 and the bearing housing maintains a margin of approximately 50% with respect to the same "allowable gap" threshold 506 of FIG. 5.

In accordance with aspects of this disclosure, and based on a comparison of FIG. 3 relative to FIG. 4, a seal may be placed on the outside of bolts that are used so that if leaking were to occur by gaps occurring around the location of bolts the fluid would be contained by the seal.

Figure 7:
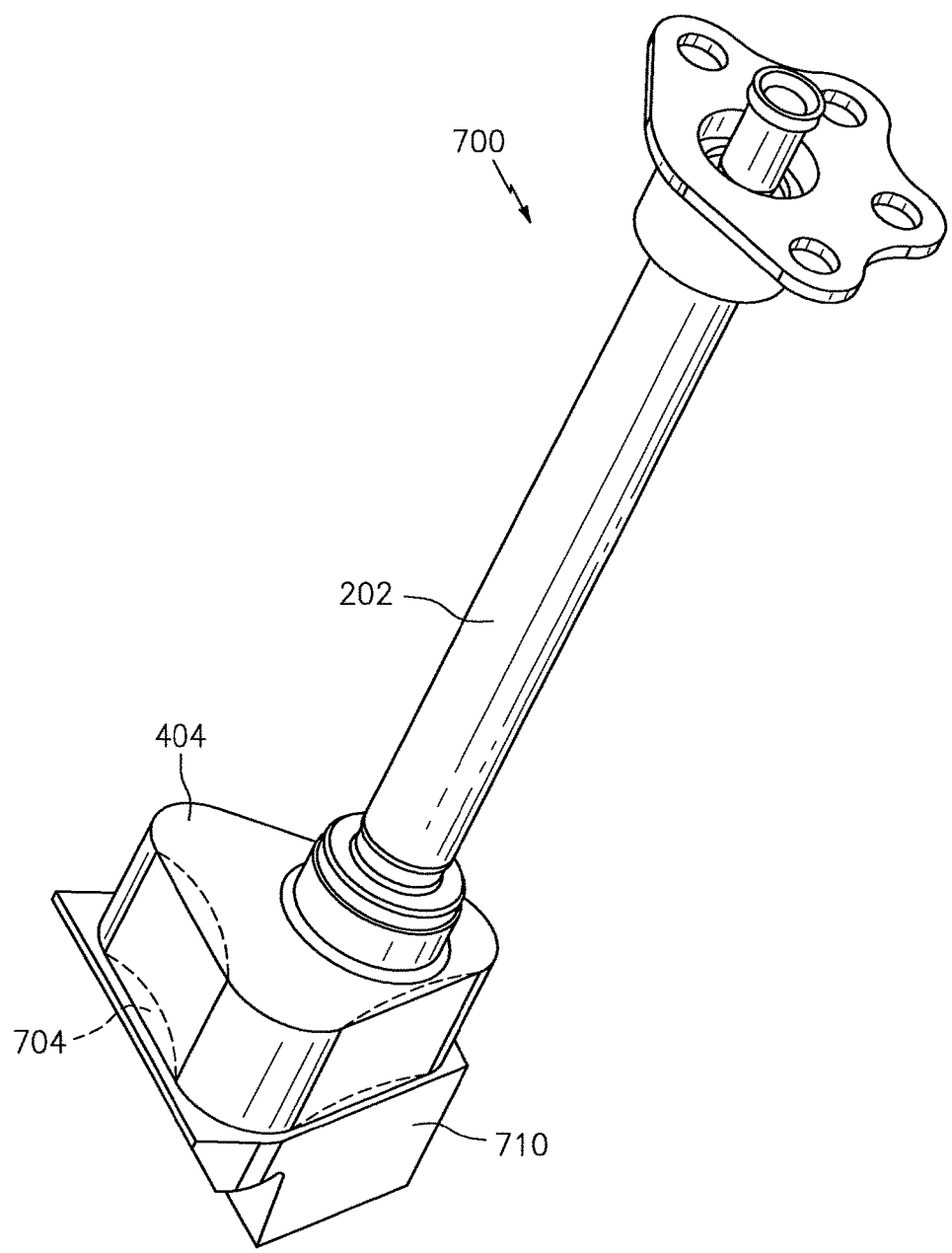
FIG. 7 illustrates an assembly in accordance with the prior art.

Referring now to FIG. 7, an assembly 700 in accordance with the prior art is shown. The assembly 700 includes the tube 202 coupled to the fitting 404, and a bearing housing 710 coupled to the fitting 404. Bolts associated with the bearing housing 710 are inadequate to sufficiently reduce thermal distortion on the fitting 404, resulting in excessive gapping as reflected via the reference character 704. The gapping 704 may correspond to the gap 504 of FIG. 5.

Figure 8:
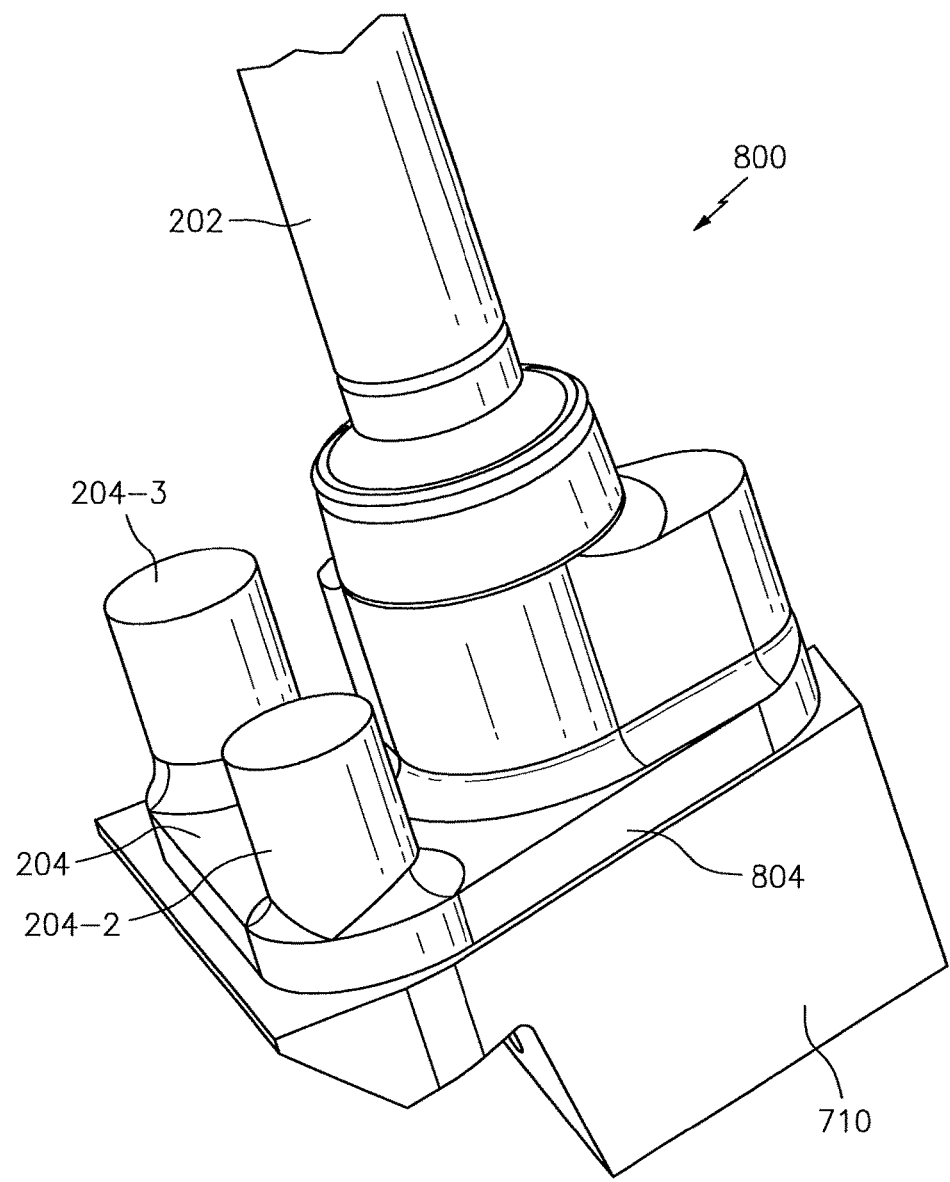
FIG. 8 illustrates an assembly in accordance with this disclosure.

FIG. 8 illustrates an assembly 800 in accordance with aspects of this disclosure. In contrast to the assembly 700/gap 704, the assembly 800 incurs less, if any, gap 804 (where the gap 804 may correspond to the gap 604 of FIG. 6). This minimization/reduction in the gap may be a function of the stiffness of the bolts in comparison to the fitting 204 allowing for a quality seating of the fitting 204 to the bearing housing 710.

Figure 9:
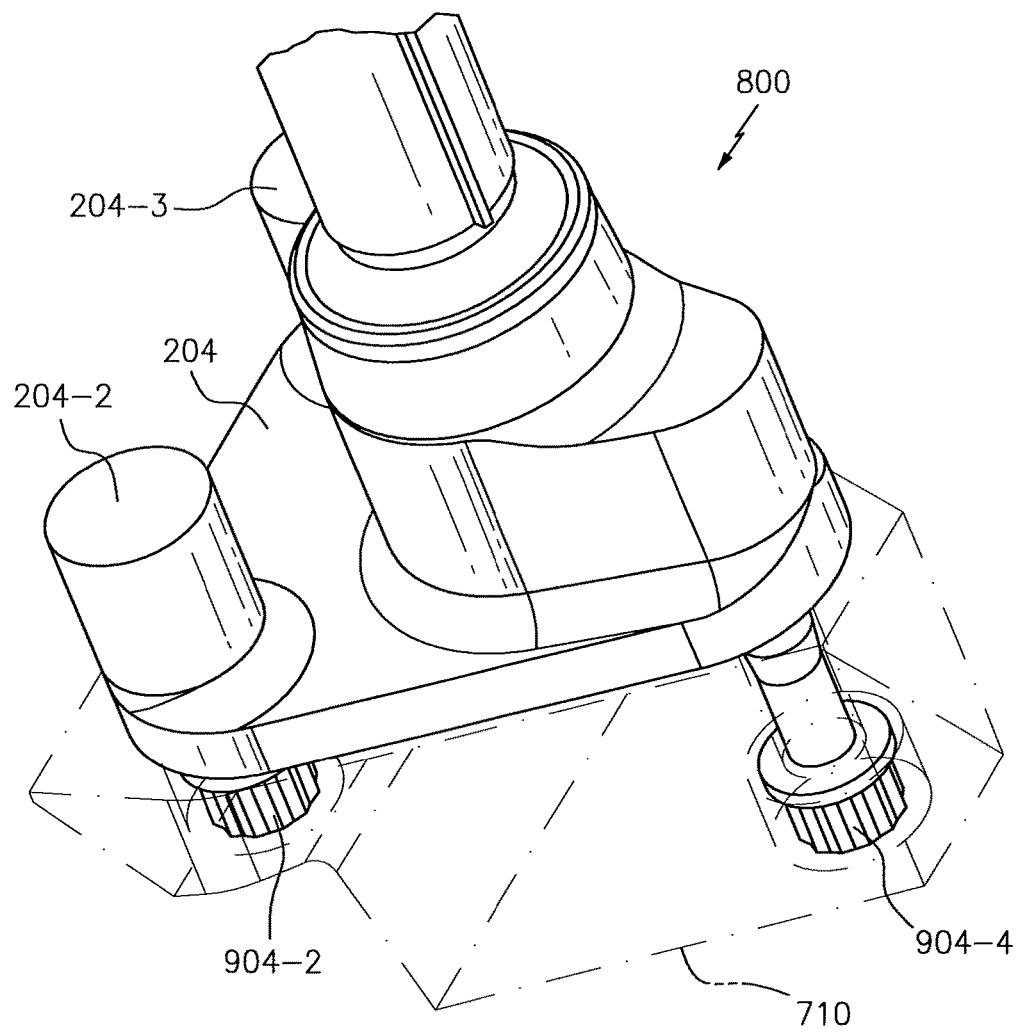
FIG. 9 illustrates a perspective view of the assembly of FIG. 8.

FIG. 9 is a perspective view of the assembly 800 of FIG. 8. In this perspective view, two bolts (denoted by reference characters 904-2 and 904-4) of the bearing housing 710 that are associated with the receptacles 204-2 and 204-4 are shown.

Technical effects and benefits of this disclosure include a fitting that maintains a higher-quality sealing contact/interface with a bearing housing. In accordance with aspects of this disclosure, this enhanced sealing may be obtained by as a result of the use of thin material sections between receptacles (e.g., tube or bolt receptacles) of the fitting. The use of such thin material sections may enable a ratio of bolt loading to fitting stiffness to increase, allowing for more thermal compliance of the fitting to mating hardware associated with the bearing housing.

Aspects of the disclosure have been described in teens of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system assembly, comprising:
   at least one tube;
   a bearing housing of an engine; and
   a fitting that includes:
   a first receptacle configured to seat the at least one tube; and at least a second receptacle configured to seat and encapsulate a corresponding at least one bolt associated with the bearing housing, wherein the fitting comprises sections between the first receptacle and the at least a second receptacle that have a material thickness in a range of 3.175 millimeters and 6.35 millimeters.

2. The system assembly of claim 1, wherein the sections are approximately 5.1 millimeters thick.

3. The system assembly of claim 1, wherein the at least a second receptacle comprises three receptacles configured to seat three corresponding bolts.

4. The system assembly of claim 1, further comprising:
a seal groove that is substantially located around the perimeter of the fitting.

5. The system assembly of claim 4, wherein the at least a second receptacle is located inward of the seal groove relative to the perimeter of the fitting.

6. The system assembly of claim 1, wherein the at least one tube is configured to convey oil or air.

7. The system assembly of claim 1, wherein the at least one tube conveys oil.

\* \* \* \* \*